(12) United States Patent
Endo et al.

(10) Patent No.: US 9,264,389 B2
(45) Date of Patent: Feb. 16, 2016

(54) INFORMATION PROCESSING APPARATUS, MAILBOX MANAGEMENT METHOD, AND STORAGE MEDIUM FOR PERFORMING CAPACITY SETTING OF A MAILBOX

(75) Inventors: Tadashi Endo, Urayasu (JP); Motoshige Suzuki, Tokyo (JP); Taro Tanaka, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/356,364

(22) Filed: Jan. 23, 2012

(65) Prior Publication Data

US 2012/0191789 A1 Jul. 26, 2012

(30) Foreign Application Priority Data

Jan. 26, 2011 (JP) ................................. 2011-014221

(51) Int. Cl.
*H04L 12/58* (2006.01)
*G06Q 10/10* (2012.01)

(52) U.S. Cl.
CPC .............. *H04L 51/22* (2013.01); *G06Q 10/107* (2013.01); *H04L 51/28* (2013.01)

(58) Field of Classification Search
None
See application file for complete search history.

(56) References Cited

U.S. PATENT DOCUMENTS

| 2005/0144527 A1* | 6/2005 | Haas et al. .................... 714/38 |
| 2006/0277287 A1* | 12/2006 | McCall et al. ................ 709/223 |
| 2008/0256537 A1* | 10/2008 | Fachan et al. .................... 718/1 |
| 2010/0011185 A1* | 1/2010 | Inoue et al. .................... 711/172 |

FOREIGN PATENT DOCUMENTS

| JP | 11-328059 A | 11/1999 |
| JP | 2002-157185 A | 5/2002 |
| JP | 2007-241595 A | 9/2007 |
| JP | 2007241595 A | 9/2007 |

OTHER PUBLICATIONS

Microsoft Exchange Documentation Team, Microsoft Exchange Documentation, Apr. 2007.*
"How to Configure Storage Quotas for a Mailbox", Jan. 31, 2007.*
Kelly, "Determining the True Amount of Space in an Exchange Database", Mar. 8, 2006.*

(Continued)

*Primary Examiner* — Lisa Lewis
*Assistant Examiner* — Henry Tsang
(74) *Attorney, Agent, or Firm* — Canon USA Inc. IP Division

(57) ABSTRACT

An information processing apparatus stores capacity limit information of a mailbox assigned to a group, and stores information of a list of a plurality of e-mail addresses belonging to the group and set capacities of individual mailboxes corresponding to individual e-mail addresses, receives a value of a set capacity of a mailbox corresponding to an e-mail address stored in a storage unit from an administrator terminal, determines whether the set capacities of all mailboxes corresponding to the plurality of e-mail addresses that belong to the group do not exceed a capacity limit of the mailbox assigned to the group, if a set capacity is changed to the set capacity of the mailbox corresponding to the received e-mail address, and updates the value of the set capacity of the mailbox corresponding to the received e-mail address if it is determined that the set capacities do not exceed the capacity limit.

7 Claims, 12 Drawing Sheets

(56) References Cited

OTHER PUBLICATIONS

Hobson, "Getting Mailbox Statistics in Exchange 2007", Feb. 19, 2008.*

"Configuring Exchange to receive mail for multiple domains", Dec. 3, 2007.*
"Wake Up Sleeping Mac User", Mac People, vol. 11, No. 1, Jan. 1, 2005, pp. 72-77.
"Post. Office 3.1.2", ASCII NG, Jul. 1998, pp. 130-131.

* cited by examiner

FIG.4

MY DESK

USER NAME: TARO-SAN                                                                                    LOG OUT
                                                                                                        HELP

MY DESK

MAIL
MANAGEMENT OF USER AND E-MAIL
E-MAIL ADDRESS SETTING
MAILBOX CAPACITY CHANGE
  E-MAIL ADDRESS REGISTRATION
  E-MAIL ADDRESS DELETION
  COLLECTIVE OUTPUT OF E-MAIL ADDRESSES
  COLLECTIVE REGISTRATION OF E-MAIL ADDRESSES
  ADMINISTRATOR ASSIGNMENT
  PASSWORD CHANGE OF INITIAL ADMINISTRATOR
JUNK E-MAIL FILTER
WebMail
MAILING LIST
Web
WEBSITE MANAGEMENT
FTP MANAGEMENT
DB MANAGEMENT
INSTANT WEBSITE
INSTANT Web SHOP
ACCESS ANALYSIS
SERVICE INFORMATION
CUSTOMER INFORMATION

MANUAL

PRIVACY POLICY

E-MAIL ADDRESS REGISTRATION

INPUT INFORMATION OF USER WHOSE E-MAIL ADDRESS IS TO BE REGISTERED.
REGISTER E-MAIL ADDRESS CONSISTING OF 2-32 CHARACTERS, AND PASSWORD CONSISTING OF 4-8 CHARACTERS.

| E-MAIL ADDRESS | | @sample.co.jp REQUIRED (ONE-BYTE CHARACTERS) |
| PASSWORD | | REQUIRED (ONE-BYTE CHARACTERS) |
| CONFIRM PASSWORD | | REQUIRED |
| USER NAME | | REQUIRED |
| PRONUNCIATION | | REQUIRED |
| DEPARTMENT | | |
| JOB TITLE | | |
| MAILBOX CAPACITY | 100 | MB (REMAINING AVAILABLE CAPACITY: 1250 MB) REQUIRED |
| AUTOMATIC SORT SETTING OF JUNK E-MAIL | 2008/2/20:10:04 COLLECTIVE SETTING HAS BEEN SET | |

· CONTENTS OF AUTOMATIC SORT SETTING OF JUNK E-MAIL ARE THE SAME AS CONTENTS OF JUNK E-MAIL ADMINISTRATOR COLLECTIVE SETTING]. AFTER REGISTRATION, INDIVIDUAL USER CAN CHANGE SETTINGS IN [AUTOMATIC SORT SETTING OF JUNK E-MAIL].
· FOR E-MAIL ADDRESS, ONE-BYTE ALPHABET AND NUMBERS, PERIOD ".", HYPHEN "-", AND UNDERSCORE "_" CAN BE USED.
· FOR USER NAME, DEPARTMENT, AND JOB TITLE, DOUBLE-BYTE CHARACTERS, ONE-BYTE ALPHABET AND NUMBERS, AND THE FOLLOWING ONE-BYTE SYMBOLS CAN BE USED: !"#$%&'()*+,-./:;<=>?@[\]^_`{|}
· MAILBOX CAPACITY CAN BE SET WITHIN RANGE OF 50 TO 2000 MB IN UNITS OF 50 MB. IF NUMERICAL NUMBER THAT IS NOT THE UNIT OF 50 MB, FOR EXAMPLE, "120 MB" IS INPUT, THE NUMERICAL NUMBER IS CHANGED TO "150 MB" AND SET.
· FOR DETAILS, PLEASE REFER TO USER'S MANUAL (PART FOR ADMINISTRATOR).

[ REGISTER ]   [ CORRECT THE INPUT ]

FIG.5

| USER ID | PASSWORD | USER NAME | (PRONUNCIATION) | E-MAIL ADDRESS | SET CAPACITY | USED AMOUNT | AUTHORITY |
|---|---|---|---|---|---|---|---|
| ichirou001 | 1234 | 観音一郎 | KANNON ICHIROU | ichirou@sample.co.jp | 150 MB | 123 MB | GENERAL |
| kurou222 | 9222 | 観音九郎 | KANNON KUROU | kurou@sample.co.jp | 100 MB | 88 MB | GENERAL |
| gorou421 | 5421 | 観音五郎 | KANNON GOROU | gorou@sample.co.jp | 100 MB | 56 MB | GENERAL |
| 554433 | patentxxx | 観音三郎 | KANNON SABUROU | saburou@sample.co.jp | 50 MB | 10 MB | GENERAL |
| 2010xxx | 4649 | 観音七郎 | KANNON SHICHIROU | shichirou@sample.co.jp | 100 MB | 60 MB | GENERAL |
| sirou | akimoto | 観音四郎 | KANNON SHIROU | shirou@sample.co.jp | 100 MB | 23 MB | GENERAL |
| 10ichirou | 4848 | 観音十一郎 | KANNON JUUICHIROU | juuichirou@sample.co.jp | 50 MB | 953 MB | GENERAL |
| 19rou | miwamiwa | 観音十九郎 | KANNON JUUKUROU | juukurou@sample.co.jp | 100 MB | 33 MB | GENERAL |
| tengorou | fight | 観音十五郎 | KANNON JUUGOROU | juugorou@sample.co.jp | 100 MB | 68 MB | GENERAL |
| tarou | kannon | 太郎 | TAROU | tarou@sample.co.jp | 20 MB | 13 MB | ADMINISTRATOR |
| ... | ... | ... | ... | ... | ... | ... | ... |

FIG.6

| MY DESK | | | | | | |
|---|---|---|---|---|---|---|
| USER NAME: TARO-SAN | | | | | | LOG OUT |

MY DESK     [HELP]

MAIL
- MANAGEMENT OF USER AND E-MAIL
- E-MAIL ADDRESS SETTING
- ▲ MAILBOX CAPACITY CHANGE
- ▲ E-MAIL ADDRESS REGISTRATION
- E-MAIL ADDRESS DELETION
- ▲ COLLECTIVE OUTPUT OF E-MAIL ADDRESSES
- ▲ COLLECTIVE REGISTRATION OF E-MAIL ADDRESSES
- ADMINISTRATOR ASSIGNMENT
- ▲ PASSWORD CHANGE OF INITIAL ADMINISTRATOR

JUNK E-MAIL FILTER / WebMail
MAILING LIST / Web
WEBSITE MANAGEMENT
FTP MANAGEMENT
DB MANAGEMENT
INSTANT WEBSITE
INSTANT Web SHOP
ACCESS ANALYSIS
SERVICE INFORMATION
CUSTOMER INFORMATION

MANUAL

PRIVACY POLICY

🔔 MAILBOX CAPACITY CHANGE

SET MAILBOX CAPACITY FOR INDIVIDUAL REGISTERED E-MAIL ADDRESS.
MAILBOX CAPACITY CAN BE SET WITHIN RANGE OF 50 TO 2000 MB IN UNITS OF 50 MB.
IF NUMERICAL NUMBER THAT IS NOT THE UNIT OF 50 MB, FOR EXAMPLE, "120 MB" IS INPUT,
THE NUMERICAL NUMBER IS CHANGED TO "150 MB" AND SET.

CURRENT ALLOCATED CAPACITY: 1950 MB (TOTAL DISK CAPACITY: 2000 MB)
REMAINING AVAILABLE CAPACITY: 100 MB

| USER NAME (PRONUNCIATION) | E-MAIL ADDRESS | USED AMOUNT | USAGE RATE | CURRENT SET CAPACITY | CHANGE THE SET CAPACITY TO |
|---|---|---|---|---|---|
| 観音一郎 KANNON ICHIROU | ichirou@sample.co.jp | 123 MB | 82 % | 150 MB | ✗ 100 MB |
| 観音九郎 KANNON KUROU | kurou@sample.co.jp | 88 MB | 88 % | 100 MB | 100 MB |
| 観音五郎 KANNON GOROU | gorou@sample.co.jp | 56 MB | 56 % | 100 MB | 100 MB |
| 観音三郎 KANNON SABUROU | saburou@sample.co.jp | 10 MB | 20 % | 50 MB | 50 MB |
| 観音七郎 KANNON SHICHIROU | shichirou@sample.co.jp | 60 MB | 60 % | 100 MB | 100 MB |
| 観音四郎 KANNON SHIROU | shirou@sample.co.jp | 23 MB | 23 % | 100 MB | 100 MB |
| 観音十一郎 KANNON JUUICHIROU | juuichirou@sample.co.jp | 953 MB | 2 % | 50 MB | 50 MB |
| 観音十九郎 KANNON JUUKUROU | juukurou@sample.co.jp | 33 MB | 33 % | 100 MB | 100 MB |
| 観音十五郎 KANNON JUUGOROU | juugorou@sample.co.jp | 68 MB | 68 % | 100 MB | 100 MB |

[ SET ]    [ CORRECT THE INPUT ]

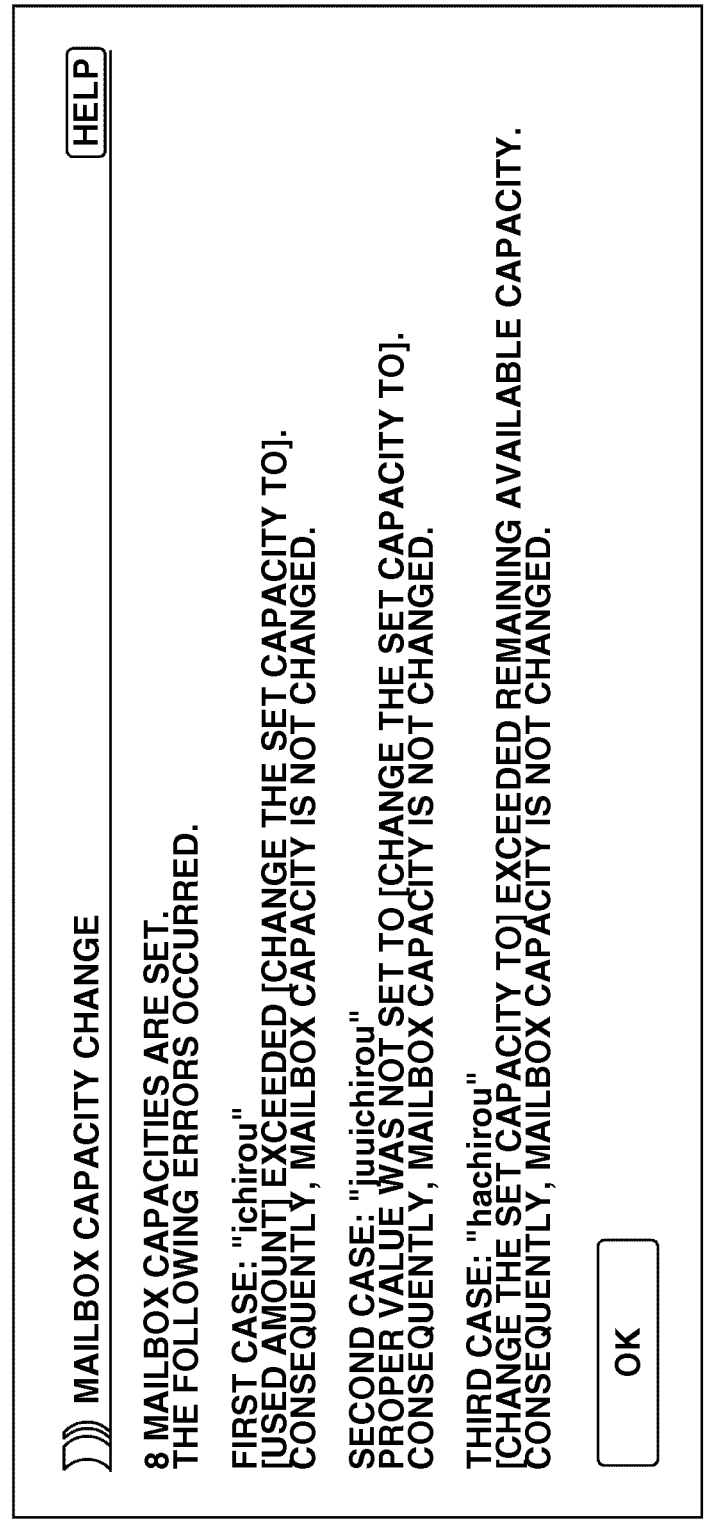

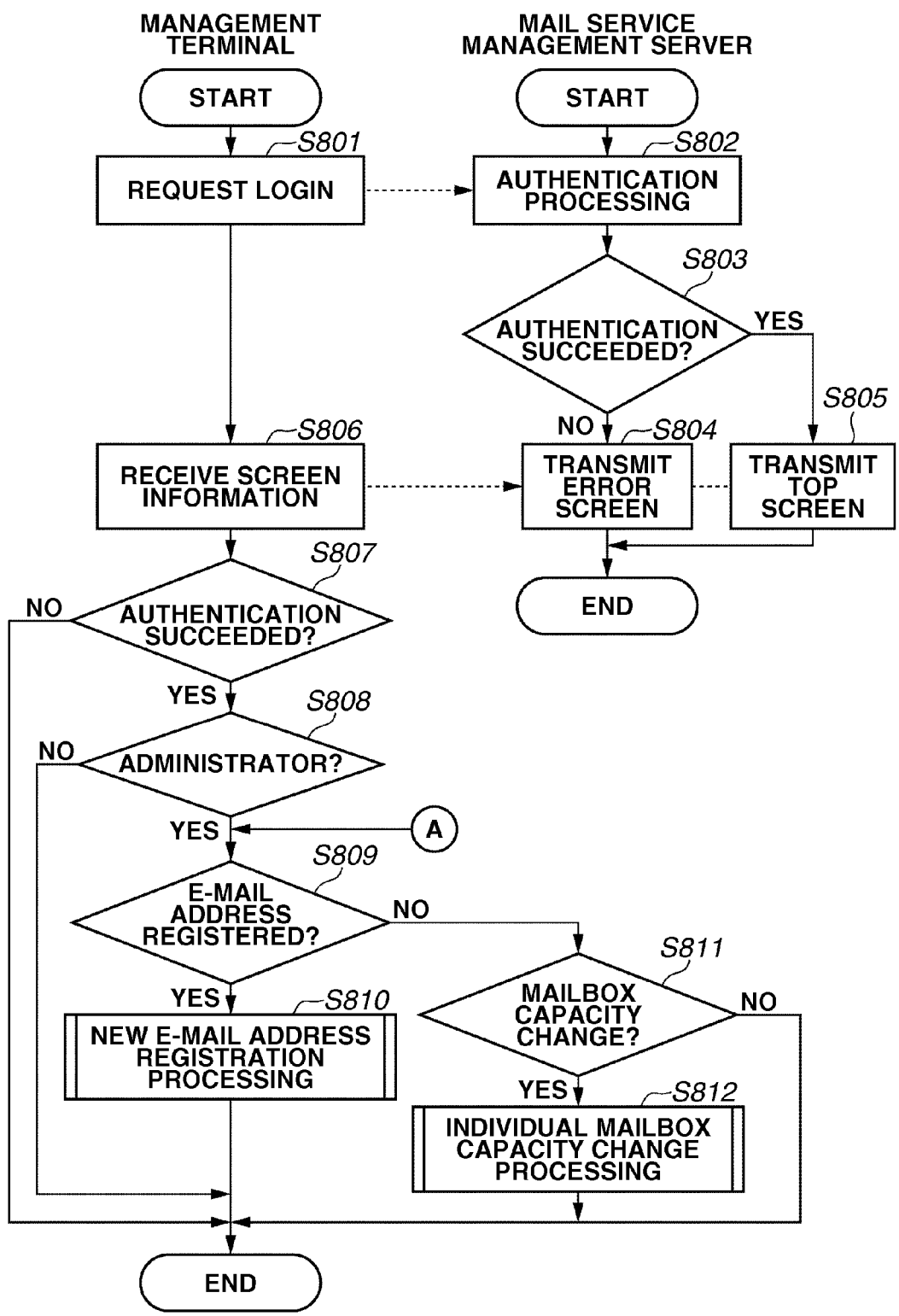

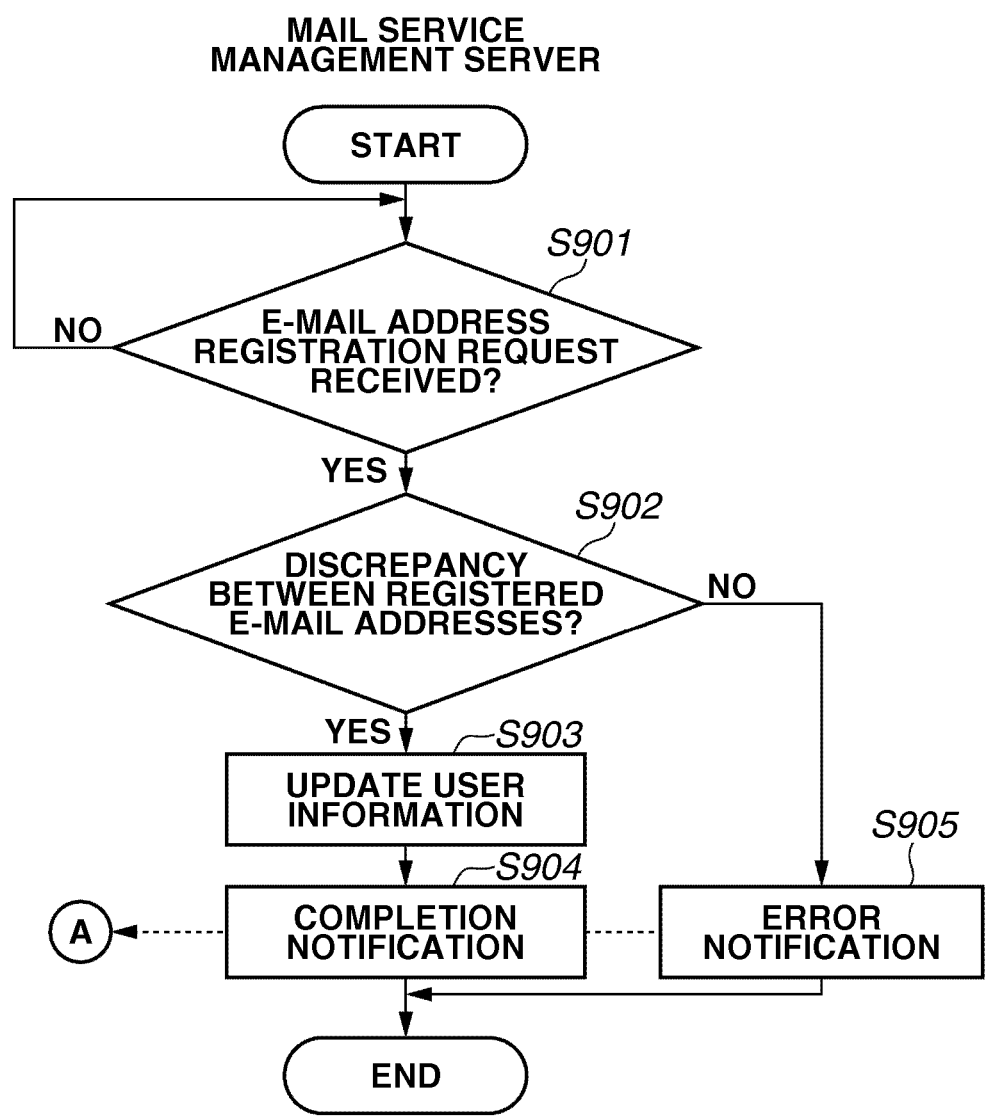

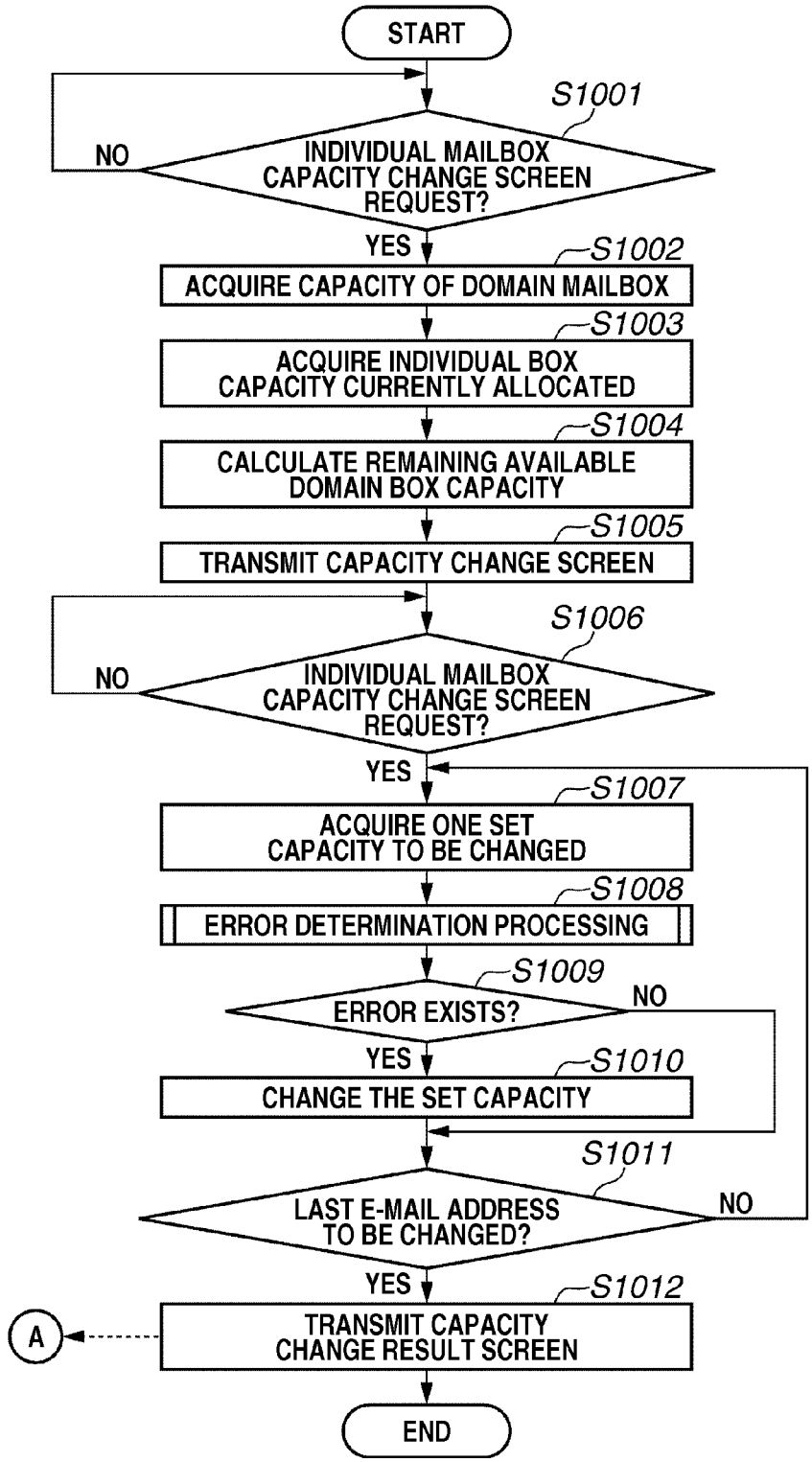

INFORMATION PROCESSING APPARATUS, MAILBOX MANAGEMENT METHOD, AND STORAGE MEDIUM FOR PERFORMING CAPACITY SETTING OF A MAILBOX

BACKGROUND OF THE INVENTION

1. Field of the Invention

The present invention relates to an information processing apparatus, a mailbox management method, and a storage medium. More particularly, the present invention relates to an information processing apparatus in a mail service system for providing a mail service to businesses and institutions, a mailbox management method, and a storage medium.

2. Description of the Related Art

In recent years, with rapid spread of the Internet, in businesses and institutions that do not have resources enough to build their own infrastructures, demands for providing Internet-access service have been increasing.

If the businesses and institutions want to start an Internet service or a mail service, the businesses and institutions are required to build their own infrastructures or use service of Internet service providers (ISPs).

The ISPs provide not only the Internet-access service but also mail services such as e-mail management, transmission and reception of e-mails, the use of web-based e-mail, and virus-infected e-mail check.

The ISPs (hereinafter, referred to as mail service systems) providing such mail services register and manage e-mail addresses of users and store e-mails using mailboxes. In such mail service systems, contracts for the mail service with the ISPs are made by individuals, businesses, or institutions, and capacities of the mailboxes are determined for each subscriber.

For example, if the subscriber is an individual, the subscriber contracts with an ISP for the individual mailbox capacity of 500 MB. If the subscriber is a business or an institution, the subscriber contracts with an ISP for the mailbox capacity of 100 GB in a domain acquired by the contract.

As described above, while the capacity of the mailbox is set for each subscriber, if the user does not delete e-mails being stored in the mailbox, the used amount of the mailbox increases, and at last, when the used amount reaches the capacity limit of the contracted mailbox, the user is not able to receive a new e-mail anymore.

To solve the problem, for example, Japanese Patent Application Laid-Open No. 11-328059 provides a technique for warning a user about capacity excess when the used amount of an individual mailbox exceeds a predetermined value.

According to the system discussed in Japanese Patent Application Laid-Open No. 11-328059, a subscriber is warned in advance if the used amount of its own mailbox approaches the contracted set capacity. According to the technique, the problem that the subscriber is not able to receive a new e-mail can be avoided.

In other solutions for the problem, contracts of different mailbox capacities can be offered for each subscriber, or the contracts can be changed to increase the mailbox capacities in the middle of the contract.

However, in the currently available mail services, the mailboxes are managed on a subscriber-by-subscriber basis, and the service of changing the capacities of the mailboxes is provided only on a subscriber's basis.

Under the circumstance, if the subscriber is a business or an institution, the business or the institution acquires a domain, equally divides the capacity into the number of e-mail addresses in the domain, and manages capacities of individual mailboxes.

However, many of the businesses that subscribe to the mail services provided by the ISPs are small-to-medium-sized businesses. Depending on business contents, some employees rarely use e-mails, and some employees transmit and receive numerous e-mails. In other words, depending on the types of business of the employees, the frequency of using the mail services and the capacities of the e-mails are different, and consequently, the usage capacities of the mailboxes are different.

SUMMARY OF THE INVENTION

The present invention is directed to providing a service enabling appropriate setting of capacities of individual mailboxes for individual e-mail addresses even if the total capacity of the mailboxes is determined for the contracted domain.

According to an aspect of the present invention, an information processing apparatus configured to serve as a mail service management server for performing capacity setting of a mailbox corresponding to an e-mail address that belongs to a specific group is provided. The information processing apparatus includes a storage unit configured to store information of a limit of a capacity of a whole mailbox assigned to the group, and store information of a list of a plurality of e-mail addresses that belong to the group, and set capacities of individual mailboxes corresponding to individual e-mail addresses, a change request reception unit configured to receive a value of a set capacity of a mailbox corresponding to an e-mail address stored in the storage unit from a terminal of an administrator, a determination unit configured to determine whether the set capacities of all mailboxes corresponding to the plurality of e-mail addresses that belong to the group do not exceed the limit of the capacity of the whole mailbox assigned to the group, if a set capacity is changed to the set capacity of the mailbox corresponding to the e-mail address, received by the change request reception unit, and an update unit configured to update the value of the set capacity of the mailbox corresponding to the e-mail address received by the change request reception unit if the determination unit determines that the set capacities do not exceed the capacity of the whole mailbox assigned to the group.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of an e-mail address registration screen to be provided and transmitted from the mail service management server displayed on a user terminal.

FIG. 5 illustrates an example of a list of user information stored in a user information database (DB).

FIG. 6 illustrates an example of a screen for changing a mailbox capacity to be provided and transmitted from the mail service management server displayed on a user terminal.

FIG. 7 illustrates an example of a screen showing results of a mailbox capacity change to be provided and transmitted from the mail service management server displayed on a user terminal.

FIG. 8 is a flowchart illustrating an example of a processing procedure to be performed in the mail service management server and a management terminal (user terminal having an administrative authority).

FIG. 9 is a flowchart illustrating an example of an e-mail address registration procedure to be performed in the mail service management server.

FIG. 10 is a flowchart illustrating an example of an individual mailbox capacity changing procedure to be performed in the mail service management server.

DESCRIPTION OF THE EMBODIMENTS

Various exemplary embodiments, features, and aspects of the invention will be described in detail below with reference to the drawings.

Hereinafter, with reference to the attached drawings, an information processing apparatus, a mailbox management method, and a storage medium according to the exemplary embodiment of the present invention is described in detail.

The information processing apparatus according to the exemplary embodiment of the present invention serves as a mail service management server for performing capacity setting of a mailbox corresponding to an e-mail address that belongs to a specific domain. The function is implemented mainly by a mail service management server 101 in a mail service system for providing a mail service to businesses and institutions.

Figure 1:
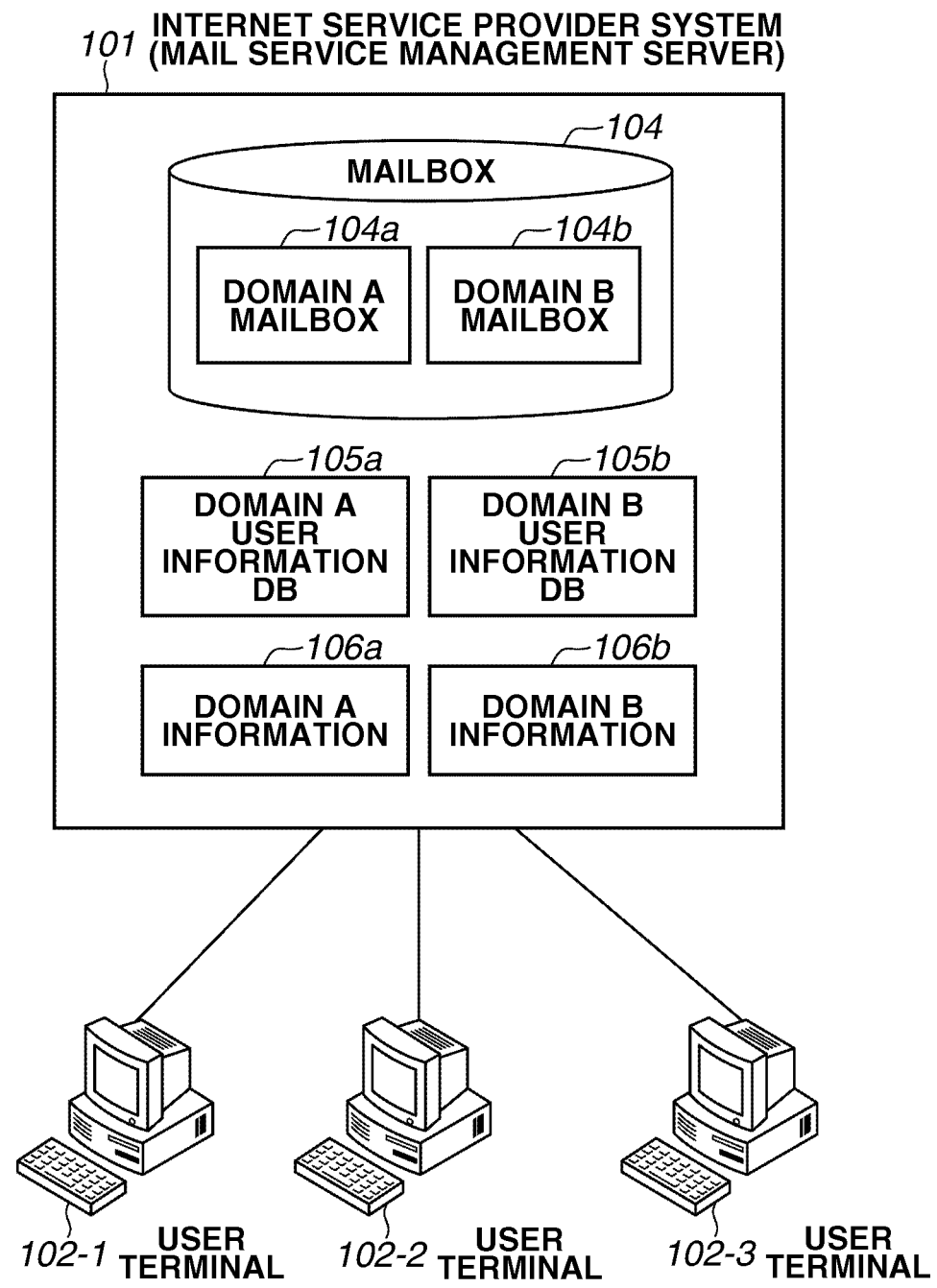
FIG. 1 is a system configuration diagram illustrating an example of an Internet service provider system including an information processing apparatus (mail service management server) according to an exemplary embodiment of the present invention.

FIG. 1 is a system configuration diagram illustrating an example of an Internet service provider system including the mail service management server 101 suitable for the information processing apparatus according to the exemplary embodiment of the present invention.

The mail service management server 101 is a main device on the server side in the Internet service provider system. The mail service management server 101 communicates with user terminals 102-1, 102-2, and 102-3, receives an authentication request from the individual user terminals, and performs authentication processing. The authenticated user terminal can receive the mail service from the mail service management server 101.

The mail service includes various services relating to e-mail, for example, transmission and reception of e-mails, storage management of e-mails, the use of web-based e-mail, and virus-infected e-mail check processing. The mail service management server 101 can provide the services relating to e-mail for the individual user terminals.

The user terminals 102-1, 102-2, and 102-3 are used by individual users to communicate with the mail service management server. For the terminals, general-purpose personal computers are used.

The mail service management server 101, in a case where a business or an institution is a subscriber, sets conditions on a domain-by-domain basis. For example, to a "domain A", the mail service management server 101 can assign a mailbox by 2 GB, and any number of e-mail addresses can be acquired. Similarly, to a "domain B", a mailbox of 4 GB can be assigned by a contract. As described above, the information of the capacity limits of the whole mailboxes assigned to the individual domains is stored for each domain as domain A information 106a, and domain B information 106b.

The individual e-mail addresses of the users belonging to the domain A are stored in a domain A user information DB 105a. The individual e-mail addresses of the users belonging to the domain B are stored in a domain B user information DB 105b.

The mailboxes corresponding to the individual e-mail addresses of the users belonging to the domain A are stored in a domain A mailbox 104a. The mailboxes corresponding to the individual e-mail addresses of the users belonging to the domain B are stored in a domain B mailbox 104b.

Figure 12:
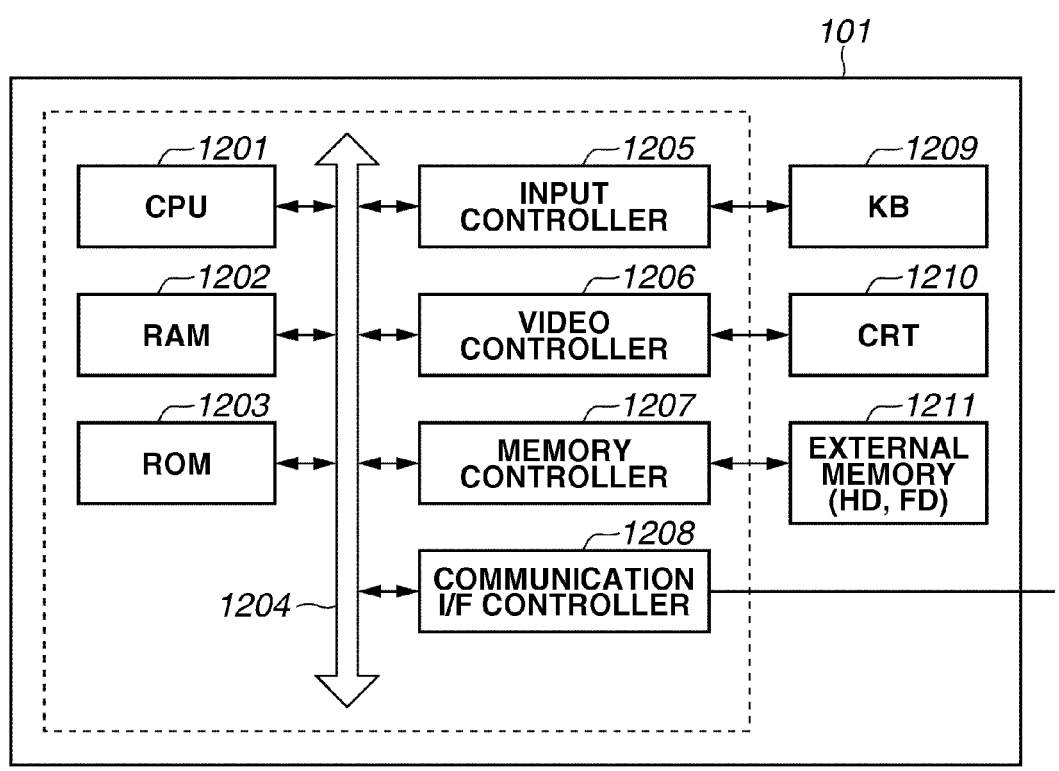
FIG. 12 is a hardware configuration diagram illustrating an example of a configuration of the mail service management server.

FIG. 12 is a hardware configuration diagram illustrating an example of a hardware configuration of the mail service management server 101.

As illustrated in FIG. 12, in the mail service management server 101, via a system bus 1204, a central processing unit (CPU) 1201, a random access memory (RAM) 1202, a read-only memory (ROM) 1203, an input controller 1205, a video controller 1206, a memory controller 1207, and a communication interface (I/F) controller 1208 are connected with each other.

The CPU 1201 performs overall control of the devices and controllers connected to the system bus 1204.

The ROM 1203 or an external memory 1211 that serves as storage devices stores the basic input/output system (BIOS) that is a control program executable by the CPU 1201, an operating system (OS), a computer-readable and executable program, and various kinds of data (including a data table) used for implementing a transmission destination specifying method.

The RAM 1202 serves as a main memory, a work area, or the like of the CPU 1201. The CPU 1201 loads a necessary program, or the like in executing processing from the ROM 1203 or the external memory 1211 that is a storage device, into the RAM 1203, and implements various kinds of operations by executing the loaded program.

The input controller 1205 controls input from a keyboard 1209. The video controller 1206 controls display output to a cathode ray tube (CRT) 1210 that is an example of a display unit. The memory controller 1207 controls reading of the information stored in the external memory 1211 and writing of the information to the external memory 1211.

The communication I/F controller 1208 is connected to a communication line, and controls transmission and reception of data with the individual user terminals 102.

The external memory 1211 stores user information of individual domains described below with reference to FIG. 5, and computer-readable and executable programs illustrated in control flowcharts described below with reference to FIGS. 8 to 11. More specifically, the external memory 1211 stores list information (the domain A user information DB and the domain B user information DB) of a plurality of e-mail addresses belonging to the domains and the set capacities of the individual mailboxes corresponding to the individual e-mail addresses. Display screens to be displayed on the individual user terminal sides described below with reference to FIGS. 3, 4, 6, and 7 are generated on the mail service management server side, however, the external memory 1211 previously stores template parts (parts not to be changed) of the display screens.

The external memory 1211 further stores the information (the domain A information 106*a*, and the domain B information 106*b*) of the capacity limits of the whole mailboxes assigned to the individual domains.

The external memory 1211 is a medium for permanently storing the information, and is not limited to a storage device such as a hard disk. For example, the external memory 1211 can be a medium such as a solid-state drive (SSD).

Figure 2:
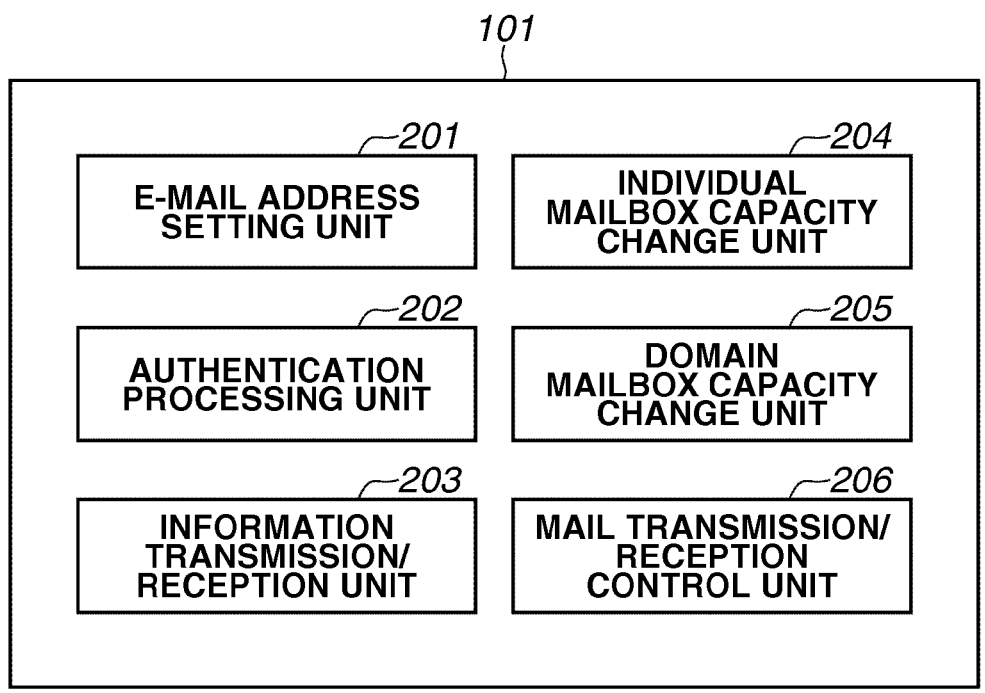
FIG. 2 is a functional configuration diagram illustrating an example of a configuration of the mail service management server.

FIG. 2 is a functional configuration diagram illustrating an example of a functional configuration of the information processing apparatus (the mail service management server 101) according to the exemplary embodiment of the present invention.

The mail service management server 101 includes an e-mail address setting unit 201, an authentication processing unit 202, an information transmission and reception unit 203, an individual mailbox capacity change unit 204, a domain mailbox capacity change unit 205, and a mail transmission and reception control unit 206 as the functional configuration.

The e-mail address setting unit 201 performs setting of a new e-mail address and deletion of a set e-mail address according to a setting request from the user terminal 102 having the administrative authority. The e-mail address registration processing is described below with reference to FIG. 4.

The authentication processing unit 202 performs authentication processing according to a login request (authentication request) from the user terminal 102. Specifically, according to a login screen acquisition request from the user terminal 102, a login screen (not illustrated in the drawings) is transmitted and displayed on the user terminal. Then, a user identifier (ID) and a password input by the user through the login screen are transmitted. The user ID and the password are registered in the user information DB illustrated in FIG. 5, and by searching the user information DB for the transmitted user ID and password, the authentication processing is performed.

The information transmission and reception unit 203 has a function for controlling transmission and reception of information between the user terminal 102 and the mail service management server 101. Specifically, the information transmission and reception unit 203 controls the transmission processing of the screen information in FIGS. 3, 4, 6, and 7 and the reception processing of various requests from the user terminals.

The individual mailbox capacity change unit 204 has a function for changing the capacity of a mailbox corresponding to a specified e-mail address according to a request from the user terminal of a logging-in user having the administrative authority.

The domain mailbox capacity change unit 205 has a function for changing the capacity of the mailboxes of the whole domain in which the user is being managed according to a request from the user terminal of the logging-in user having the administrative authority. In order to implement the change, the contract detail of the domain is changed and updated. The processing performed by the domain mailbox capacity change unit 205 is a known technique, and has no direct relation with the processing according to the exemplary embodiment of the present invention. Accordingly, a detailed description of this known processing is omitted.

The mail transmission and reception control unit 206 has a function for controlling a reception processing of e-mails sent to the individual e-mail addresses in the domain and a transmission processing of e-mails sent from the e-mail addresses. The processing performed by the mail transmission and reception control unit 206 is a known technique, and has no direct relation with the processing according to the exemplary embodiment of the present invention. Accordingly, a detailed description of this processing is omitted.

With reference to the flowchart in FIG. 8, a detailed processing of the whole Internet service provider system including the information processing apparatus (the mail service management server) according to the exemplary embodiment of the present invention, and the user terminal (the user terminal having the administrative authority, and corresponding to a management terminal), will now be described.

The flowchart is implemented by the CPU 1201 executing the program according to the exemplary embodiment of the present invention stored in the external memory 1211 using the RAM 1202 in the mail service management server as a work area.

In step S801, the user terminal 102 requests the login screen to the Internet service provider system. Through a login screen acquired and displayed according to the request, a user ID and a password input by the user are transmitted to the mail service management server 101 as a login request.

In step S802, based on the login request received from the user terminal 102, the mail service management server 101 searches the user information DB to determine whether the user ID included in the login request exists, and whether the user ID and the password correspond to each other. It is preferable that the domain to login is specified in the login request transmitted from the user terminal 102. For example, in the login screen displayed on the user terminal 102 in step S801, a user ID entry field, a password entry field, and a domain entry field may be provided. Based on the input, the mail service management server 101 searches the user information DB (for example, the domain A user information DB 105*a*) identified by the specified domain.

In step S803, the mail service management server 101 determines whether the authentication has been successfully done. If the domain, the user ID, and the password match respectively, the mail service management server 101 determines that the authentication has been successfully done (YES in step S803), and the processing proceeds to step S805. If the domain, the user ID, and the password do not match (NO in step S803), the mail service management server 101 determines that the authentication is a failure, and the processing proceeds to step S804.

In step S804, the mail service management server 101 reads out an error screen indicating authentication failure from the external memory 1211, and transmits the screen information (Hyper Text Markup Language (HTML) data) on the error screen as an authentication result to the user terminal 102.

On the other hand, if the authentication has been successfully done, in step S805, the login request is permitted as a result of the success of the authentication. The mail service management server 101 reads out a TOP screen after the login from the external memory 1211, and transmits the screen information (HTML data) on the TOP screen to the user terminal 102. In the processing performed on the mail service management server 101 side, a session ID for managing the session with the user terminal is stored. The communication processing itself is temporarily finished by this processing. The following communication between the user terminal 102 and the mail service management server 101 is performed based on the session ID. The session management is a known technique and therefore, a detailed description of this technique is omitted.

In the exemplary embodiment, the user terminal successfully authenticated corresponds to a user having administrative authority. The administrative authority is described with reference to FIG. 5.

FIG. 5 illustrates an example of a list of the user information stored in the user information DB 105. In the user information, user IDs, passwords, user names (pronunciation), e-mail addresses, set capacities of individual mailboxes, currently used amounts of the mailboxes, and user authorities are stored in one record. For one account, one record is registered. If the user authority is set to administrator, as described below, it is possible to issue an instruction to register or delete a new e-mail address, or change a capacity setting of an individual mailbox. If the user authority is set to general, it is not possible to perform such processing. The processing that can be performed in the case of the generally authorized user have no direct relation with the processing performed in the exemplary embodiment, and accordingly, the description of the processing is omitted. In the following processing, the user logs in the system under the administrative authority.

In step S806, the user terminal 102 receives the screen information of the error screen or the TOP screen from the mail service management server 101 and displays the information. In step S807, the user terminal 102 determines whether the authentication has been successfully done. If the authentication is a failure and the error screen is displayed (NO in step S807), the processing ends. If the user terminal 102 determines that the authentication has been successfully done (YES in step S807), in step S808, the user terminal 102 determines whether the authority of the logging-in user is set to the administrative authority. If the authority of the logging-in user is not set to the administrative authority, that is, the authority is set to the general authority (NO in step S808), the processing has no relation with the exemplary embodiment. Accordingly, the description of the other processing is omitted, and the processing ends in the flowchart.

Figure 3:
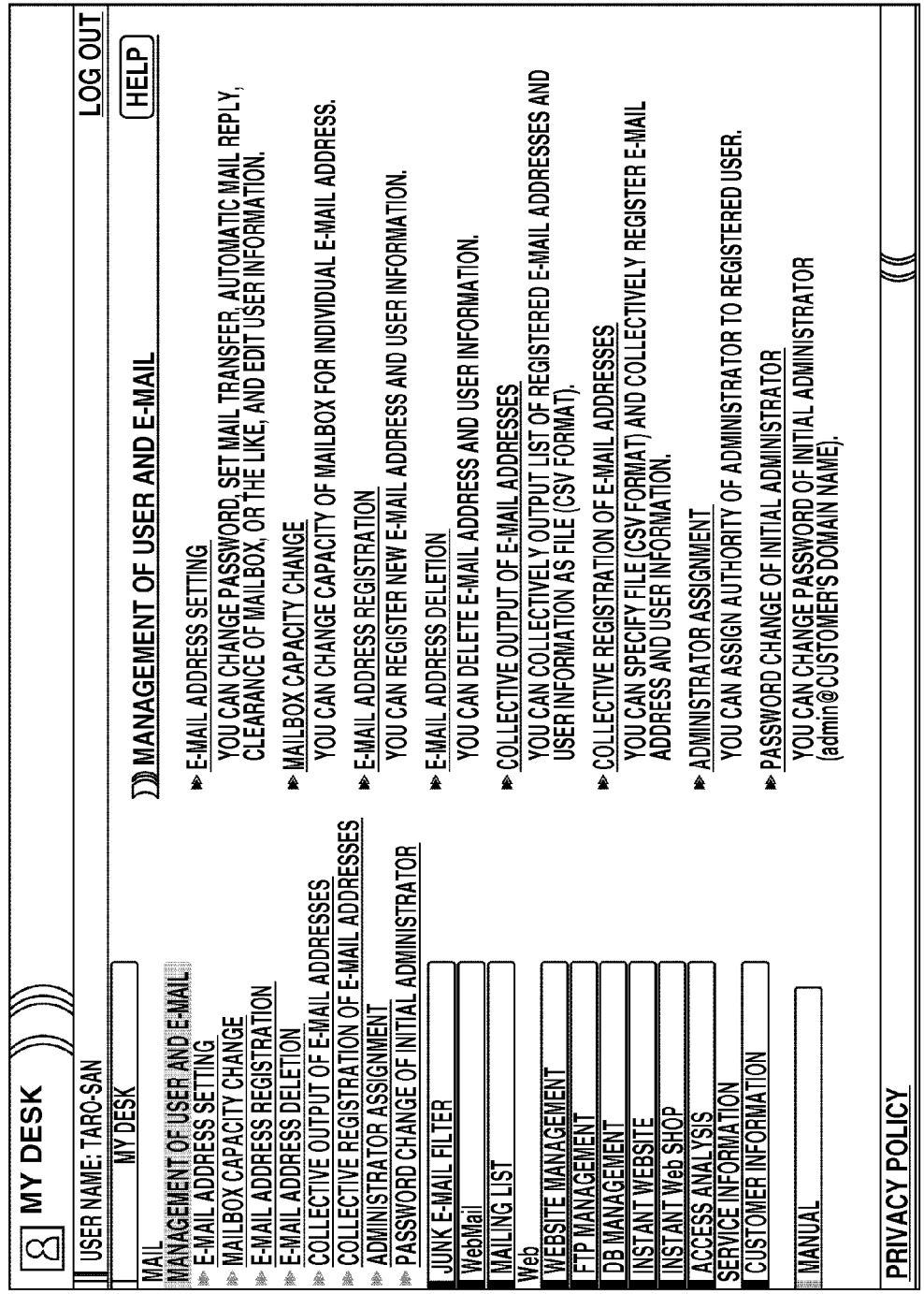
FIG. 3 illustrates an example of a TOP screen to be provided and transmitted from the mail service management server displayed on a user terminal.

If the authority of the logging-in user is set to the administrative authority (YES in step S808), the TOP screen illustrated in FIG. 3 is displayed.

FIG. 3 illustrates an example of the TOP screen to be provided and transmitted from the mail service management server to be displayed on the user terminal 102.

If the user logs in under the administrative authority, HTML data of the TOP screen in FIG. 3 is transmitted, and the data is displayed in the browser of the user terminal 102. On the TOP screen, in addition to "e-mail address registration" and "mailbox capacity change", various settings such as "assignment of the administrator" can be performed. In the exemplary embodiment, "e-mail address registration" and "mailbox capacity change" are main functions, and accordingly, the detailed description of the other processing is omitted.

The screen information on the TOP screen is formed such that if the user presses the link of "E-MAIL ADDRESS REGISTRATION" on the TOP screen, a request for the e-mail address registration screen is issued to the mail service management server 101. If user presses the link of "MAILBOX CAPACITY CHANGE", a request for changing the mailbox capacity is issued to the mail service management server 101.

In step S809, the user terminal 102 determines whether a request for the e-mail address registration screen is issued. If the request for the e-mail address registration screen is issued by pressing the link of "E-MAIL ADDRESS REGISTRATION" (YES in step S809), in step S810, a new address registration processing is performed. This processing is described below with reference to FIG. 9.

In step S811, the user terminal 102 determines whether a request for changing the mailbox capacity is issued. If the request for changing the mailbox capacity is issued by pressing the link of "MAILBOX CAPACITY CHANGE" (YES in step S811), in step S812, an individual mailbox capacity change processing is performed. This processing is described below with reference to FIG. 10.

If the new address registration processing and the individual mailbox capacity change processing end, the display returns to the TOP screen (or a result screen is displayed). When the administrator presses the link of log out on the upper right on the screen, a log-out request is transmitted to the mail service management server 101 and the processing ends. On the mail service management server side, if the log-out request is received, the session ID being managed is deleted and the processing ends. Similarly to known techniques, the session ID may be automatically processed as log-out after a predetermined time period has lapsed, for example, about 30 minutes, and deleted.

With reference to the flowchart in FIG. 9, the e-mail address registration processing in the information processing apparatus (the mail service management apparatus) according to the exemplary embodiment of the present invention is described in detail.

The flowchart is implemented by the CPU 1201 executing the program according to the exemplary embodiment of the present invention stored in the external memory 1211 using the RAM 1202 in the mail service management server 101 as a work area.

In step S901, the mail service management server 101 determines whether a registration request of an e-mail address is received from the terminal of the administrator. The e-mail address registration request is received in step S901. This processing is specifically described. If the user having the administrative authority presses the link of "E-MAIL ADDRESS REGISTRATION" on the TOP screen (FIG. 3), the request for the e-mail address registration screen is transmitted to the mail service management server 101. If the mail service management server 101 receives the request, the mail service management server 101 reads out the e-mail address registration screen illustrated in FIG. 4 from the external memory 1211, and transmits the data to the terminal of the administrator.

FIG. 4 illustrates an example of the e-mail address registration screen to be provided and transmitted from the mail service management server to be displayed on the user terminal 102 (the terminal of the administrator). On the e-mail address registration screen, a registration of a new e-mail address can be instructed. As necessary information, a new e-mail address, a password, a user name, pronunciation, and the like can be input. After inputting the bibliographic information, the administrator presses the "REGISTER" button at a lower part on the screen, and the input bibliographic information is transmitted as an e-mail address registration request to the mail service management server 101.

If the mail service management server 101 receives the e-mail address registration request, instep S902, the mail service management server 101 determines whether the e-mail address matches the e-mail address that has already been registered. If the administrator of the domain A transmits a request of registration of a new e-mail address, the mail service management server 101 determines whether the same e-mail address has already been registered in the user information (FIG. 5), for example, in the domain A user information DB 105a. If the mail service management server 101 determines that the e-mail address is already registered (YES in step S902), in step S905, the mail service management server 101 generates a registration error notification screen, and returns the registration error notification screen to the terminal of the administrator.

If the mail service management server 101 determines that no matching e-mail address exists (NO in step S902), it means that the request of registration of the new e-mail address is correctly accepted. Then, the processing proceeds to step S903. In step S903, the mail service management server 101 updates the user information, and writes the information as a new record in the user information DB. In the e-mail address registration request, as illustrated in FIG. 4, the "MAILBOX CAPACITY" field is provided. The capacity specified in the field is to be set and registered as the set capacity of the e-mail address. In the example illustrated in FIG. 4, the information of "REMAINING AVAILABLE CAPACITY" is displayed on the registration screen. A calculation method of the information is described below.

In step S904, the mail service management server 101 transmits a completion notification to the terminal of the administrator. By the processing described above, the new e-mail address is registered, and the set capacity of the mailbox corresponding to the e-mail address is set and registered.

If the completion notification or the error notification is issued, the processing on the side of the terminal of the administrator (the user terminal) returns to the processing instep S809. Thus, it is possible to issue another processing request.

With reference to the flowchart in FIG. 10, the individual mailbox setting capacity change processing by the information processing apparatus (the mail service management apparatus) according to the exemplary embodiment of the present invention is described in detail.

The flowchart is implemented by the CPU 1201 executing the program according to the exemplary embodiment of the present invention stored in the external memory 1211 using the RAM 1202 in the mail service management server 101 as a work area.

Instep S1001, the mail service management server 101 determines whether a request for a screen to change the set capacity of an individual mailbox is received from the terminal of the administrator. The request for the screen to change the set capacity of the individual mailbox is received in step S812. This processing is specifically described. If the user having the administrative authority presses the link of "MAILBOX CAPACITY CHANGE" on the TOP screen (FIG. 3), the request for the screen to change the set capacity of the individual mailbox is transmitted to the mail service management server 101. If the mail service management server 101 receives the request, the mail service management server 101 reads out the mailbox capacity change screen illustrated in FIG. 6 from the external memory 1211, and transmits the data to the terminal of the administrator. On the mailbox capacity change screen, as illustrated in FIG. 5, the information list of the users in the corresponding domain is read out and embedded (generated). The mailbox capacity change screen further includes information of "REMAINING AVAILABLE CAPACITY". A calculation method of the information is specifically described below. The "REMAINING AVAILABLE CAPACITY" displayed on the above-described e-mail address registration screen is calculated in a similar procedure.

Instep S1002, the mail service management server 101 reads out the value (the domain A information 106a, and domain B information 106b) of the capacity limit of the whole mailbox to be assigned to the domain. The value of the capacity limit is stored in the external memory 1211. In step S1003, the mail service management server 101 acquires the set capacities of the individual mailboxes currently assigned. The value is the total of the set capacities of the individual mailboxes as illustrated in the user information (FIG. 5) in the user information DB. The value is read out from the user information of the domain in which the mailbox is to be changed.

In step S1004, from the value of the capacity limit of the whole mailbox assigned to the target domain, the set capacities of the all mailboxes corresponding to the plurality of e-mail addresses belonging to the target domain are subtracted (which is performed by the calculation unit). By the processing, "REMAINING AVAILABLE CAPACITY" is calculated.

In step S1005, the mail service management server 101 transmits the set capacity change screen showing the information of the calculated "REMAINING AVAILABLE CAPACITY" to the terminal of the administrator. As described above, on the set capacity change screen of the individual mailboxes, "REMAINING AVAILABLE CAPACITY" is displayed, so that the administrator can visually recognize how much capacity can be assigned to the individual mailboxes. As a result, it is possible to reduce a number of instructions to allocate the setting capacity that cannot be set.

FIG. 6 illustrates an example of a screen for changing an individual mailbox capacity to be provided and transmitted from the mail service management server, which is displayed on a terminal of the administrator. On the screen for changing individual mailbox set capacity, the list of the users registered in the user information (FIG. 5) is displayed. As the information of the list displayed here, screen information including the user names, the pronunciation, the e-mail addresses, the used amounts, the usage rates, and the current set capacities is transmitted from the mail service management server. The "USAGE RATE" is not included in the user information DB. The usage rate is calculated by dividing a used amount by a set capacity and multiplying by 100 for each user before the change screen is transmitted in step S1005. The usage rate corresponds to the data amount stored in the mailbox corresponding to the individual e-mail address. For example, e-mails that are received and not deleted, or in a case of web-based e-mail service, e-mails stored as rough drafts, or transmitted or received e-mails are stored in the mailbox. These e-mails are counted as the usage amount.

The field of the set capacity to be changed is an item that can be input as a numerical value by the administrator on the side of the terminal of the administrator. Although any numerical value can be input, in the exemplary embodiment, the set capacity to be changed is restricted such that the capacity can be changed by 50 MB. It is possible not to impose the restriction. However, the imposition of the restriction will make it easier for the administrator to manage the system. Further, on the screen for changing mailbox set capacity, a script is downloaded together. By executing the script, a simple error check and a warning display can be made only on the side of the terminal of the administrator. For example, as illustrated in FIG. 6, if a value (for example, 100 MB) input by the administrator as the capacity to be changed is smaller than the current used amount (for example, 123 MB), a warning mark "×" is displayed near the field of "CHANGE SET CAPACITY TO". If the "SET" button at the lower part of the change screen is pressed, request to change the individual mailbox set capacity is transmitted to the mail service management server 101.

In step S1006, the mail service management server 101 determines whether the request to change the individual mailbox set capacity is received from the terminal of the administrator. More specifically, the mail service management server 101 receives the value of the set capacity of the mailbox corresponding to the e-mail address stored in the external memory 1211 from the terminal of the administrator (which is performed by the change request reception unit). In response to the reception of the request to change the individual mailbox set capacity, in step S1007, the mail service management server 101 acquires one setting capacity of the mailbox corresponding to the e-mail address. On the acquired setting capacity of the mailbox, in step S1008, the mail service management server 101 performs an error determination processing. This error determination processing is described below with reference to FIG. 11.

In step S1009, the mail service management server 101 determines whether an error exists as a result of the processing in step S1008. If the mail service management server 101 determines that no error exists (NO in step S1009), the change of the set capacity can be performed. In step S1011, the mail service management server 101 changes and updates the set capacity of the corresponding mailbox to the specified setting capacity. In the setting capacity of the mailbox, the user information DB is written, and further, the capacity is ensured by the mailbox for the domain of the actual mailbox 104 (for example, the domain A mailbox 104a).

In step S1009, if the mail service management server 101 determines that an error exists (YES in step S1009), or if the mail service management server 101 changes the set capacity in step S1010, the mail service management server 101 determines whether the mailbox corresponds to a last e-mail address specified in the request for changing the set capacity. If the mailbox is not the mailbox corresponding to the last e-mail address, increment is performed and the processing returns to step S1007. In step S1007, a request to change setting of a mailbox corresponding to a next e-mail address is processed.

If the change and update processing of the set capacity of the mailbox corresponding to the last e-mail address is performed, in step S1012, the mail service management server 101 transmits a capacity change result screen to the terminal of the administrator. FIG. 7 illustrates an example of the capacity change result screen. In the example in FIG. 7, in a case where change requests determined to be errors exist in the processing for changing the capacities of the individual mailboxes, the dialogue screen showing the user names and character strings is displayed. The character strings indicate the reasons why the change processing was not successfully performed (resulted in errors).

If the capacity change result screen is transmitted, the processing on the side of the terminal of the administrator (the user terminal) returns to the processing in step S809. Thus, it becomes possible to deal with another processing request.

Figure 11:
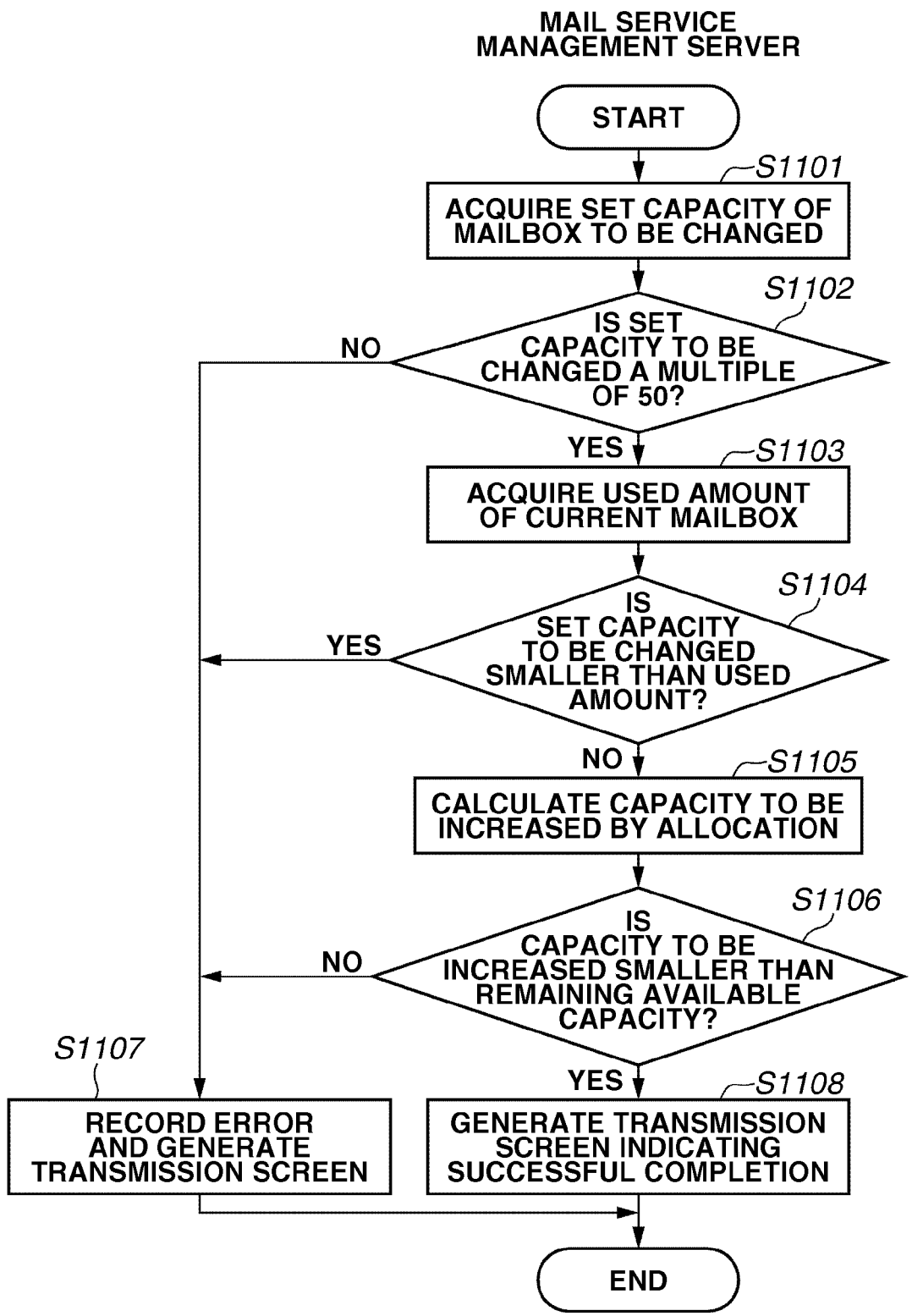
FIG. 11 is a flowchart illustrating an example of an error determination procedure to be performed in the mail service management server.

With reference to the flowchart in FIG. 11, the error determination processing (step S1008 in FIG. 10) by the information processing apparatus (the mail service management apparatus) according to the exemplary embodiment of the present invention is described in detail.

The flowchart is implemented by the CPU 1201 executing the program according to the exemplary embodiment of the present invention stored in the external memory 1211 using the RAM 1202 in the mail service management server 101 as a work area.

In step S1101, the value of "CHANGE SET CAPACITY TO" of the change target mailbox is acquired. As described above, the value of "CHANGE SET CAPACITY TO" is the value input by the administrator through the change screen in FIG. 6 from the terminal of the administrator.

Instep S1102, the mail service management server 101 determines whether the value of "CHANGE SET CAPACITY TO" is a multiple of "50". As described above, in the exemplary embodiment, the set capacity of the mailbox can be changed by 50 MB. Accordingly, if the value is not a multiple of 50 MB, the input is recognized as an error.

If the value of "CHANGE SET CAPACITY TO" is not a multiple of the predetermined unit, the processing proceeds to step S1107. In step S1107, an error record is recorded and a transmission screen is generated. Specifically, as illustrated in FIG. 7, the message "PROPER VALUE WAS NOT SET TO [CHANGE SET CAPACITY TO]. CONSEQUENTLY, MAILBOX CAPACITY IS NOT CHANGED" is generated in the transmission screen.

In the exemplary embodiment, the value of 50 MB is used as the unit. The value is not limited to 50 MB, any predetermined unit can be used. Further, in order to facilitate the management, the predetermined unit is used, however, such a restriction may not be imposed. If the restriction is not imposed, the processing in step S1102 can be omitted.

In step S1103, the value of "CURRENT USED AMOUNT" of the change target mailbox is acquired. The current used amount is managed in the user information (FIG. 5) in the user information DB 105.

In step S1104, the mail service management server 101 determines whether the value of "CHANGE SET CAPACITY TO" is smaller than the value of "CURRENT USED AMOUNT". More specifically, if the set capacity is changed to the capacity of the mailbox corresponding to the received e-mail address, it is determined whether the set capacities of the all mailboxes corresponding to the plurality of e-mail addresses belonging to the domain do not exceed the capacity limit of the whole mailbox assigned to the domain (which is performed by the determination unit). If the value of "CHANGE SET CAPACITY TO" is smaller than the value of "CURRENT USED AMOUNT", it is not possible to perform the change of the set capacity. Then, the processing proceeds to step S1107. In step S1107, an error record is written and a transmission screen is generated. Specifically, as illustrated in FIG. 7, the message "[USED AMOUNT] EXCEEDED [CHANGE SET CAPACITY TO]. CONSEQUENTLY, MAILBOX CAPACITY IS NOT CHANGED" is generated in the transmission screen.

In step S1105, a value of "SET CAPACITY OF MAILBOX TO BE INCREASED BY ASSIGNMENT" is calculated. Specifically, by subtracting the value of "CURRENT USED AMOUNT" from the value of "CHANGE SET CAPACITY TO" of the current change target mailbox, the capacity to be increased by the assignment can be calculated.

In step S1106, the mail service management server 101 determines whether the value of "SET CAPACITY OF MAILBOX TO BE INCREASED BY ASSIGNMENT" is smaller than the value of "REMAINING AVAILABLE CAPACITY". The value of "REMAINING AVAILABLE CAPACITY" is calculated in step S1004 in FIG. 10. Every time the error determination processing is performed with respect to the change target mailbox, a latest value of "REMAINING AVAILABLE CAPACITY" may be calculated. The calculation method in such a case is similar to that in step S1004, and accordingly, the description of the method is omitted.

If the value of "SET CAPACITY OF MAILBOX TO BE INCREASED BY ASSIGNMENT" is smaller than the value of "REMAINING AVAILABLE CAPACITY", the processing proceeds to step S1107. In step S1107, an error record is recorded and a transmission screen is generated. Specifically, as illustrated in FIG. 7, the message "[CHANGE SET CAPACITY TO] EXCEEDED REMAINING AVAILABLE CAPACITY. CONSEQUENTLY, MAILBOX CAPACITY IS NOT CHANGED" is generated in the transmission screen.

In step S1108, as a result of the error determination processing, the mail service management server 101 determines that all processing is successfully performed. In response to the determination, the mail service management server 101 generates a transmission screen indicating the normal completion of the processing and ends the processing. The transmission screen indicating the normal completion needs to be generated only when the processing of the all change target mailboxes is normally completed. If one error occurs, the transmission screen for error in step S1107 is to be transmitted as the result.

As described above, in the exemplary embodiment, even if the total capacity of the mailbox is set for each of the contracted domain, the service enabling the appropriate setting of the capacities of the individual mailboxes for the individual e-mail addresses can be provided.

It is to be understood that the configurations and the contents of the above-described various types of data are not limited to the above-described exemplary embodiment, depending on the uses or purposes, various configurations or contents may be provided.

Other Embodiments

Aspects of the present invention can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-014221 filed Jan. 26, 2011, which is hereby incorporated by reference herein in its entirety.

What is claimed is:

1. An information processing apparatus configured to serve as a mail service management server for storing a plurality of mailboxes that belongs to domains and performing capacity setting of a mailbox corresponding to an e-mail address included in a plurality of e-mail addresses that belongs to a specific domain from among the plurality of mailboxes that belongs to the domains, the information processing apparatus comprising:
   a storage unit configured to store information of a limit of a capacity of a whole mailbox assigned to the specific domain, and store information of set capacities of individual mailboxes corresponding to individual e-mail addresses included in the plurality of e-mail addresses that belongs to the specific domain;
   a specifying unit configured to specify a remaining available capacity based on the information of the set capacities of the individual mailboxes and the information of the limit of the capacity of the whole mailbox;
   a change screen transmission unit configured to transmit, to an external apparatus, a change screen on which values of the set capacities of the mailboxes corresponding to the individual e-mail addresses can be individually received, the change screen including information of the remaining available capacity specified by the specifying unit;
   a reception unit configured to receive from the external apparatus, a value of a set capacity of a mailbox corresponding to an e-mail address included in the plurality of e-mail addresses, the value of the set capacity being received via the change screen transmitted by the change screen transmission unit;
   a determination unit configured to determine whether the set capacities of all mailboxes corresponding to the plurality of e-mail addresses that belong to the specific domain do not exceed the limit of the capacity of the whole mailbox assigned to the specific domain if the set capacity of the mailbox corresponding to the e-mail address included in the plurality of e-mail addresses is changed to the value received by the reception unit; and
   a changing unit configured to change the set capacity of the mailbox corresponding to the e-mail address to the value received by the reception unit if the determination unit determines that the set capacities of all mailboxes corresponding to the plurality of e-mail addresses that belongs to the specific domain do not exceed the limit of the capacity of the whole mailbox assigned to the specific domain,
   wherein the storage unit, the specifying unit, the change screen transmission unit, the reception unit, the determination unit, and the changing unit are implemented, at least in part, by a central processing unit (CPU) and a memory.

2. The information processing apparatus according to claim 1, wherein
   the change screen transmission unit transmits the change screen in response to a request from the external apparatus.

3. The information processing apparatus according to claim 1, wherein
   the specifying unit specifies the remaining available capacity by subtracting the set capacities of all mailboxes corresponding to the plurality of e-mail addresses that belongs to the specific domain, from the limit of the capacity of the whole mailbox assigned to the specific domain.

4. The information processing apparatus according to claim 1, wherein the storage unit stores a value of current used capacity of the individual mail boxes, and
   the information processing apparatus further comprising:
   an error processing unit configured to perform error determination if the value received by the reception unit is smaller than the value of the current used capacity of the mailbox corresponding to the e-mail address, and
   wherein the error processing unit is implemented, at least in part, by the CPU and the memory.

5. The information processing apparatus according to claim 4, wherein if the error processing unit makes an error determination, processing of a change request of a set capacity of a mailbox corresponding to an e-mail address next to an e-mail address that is determined to be an error is continued.

6. A mailbox management method in an information processing apparatus for storing a plurality of mailboxes that belongs to domains and performing capacity setting of a mailbox corresponding to an e-mail address included in a plurality of e-mail addresses that belongs to a specific domain from among the plurality of mailboxes that belongs to the domains, the mailbox management method comprising:

obtaining, by an obtaining unit, information of a limit of a capacity of a whole mailbox assigned to the specific domain, and obtaining information of set capacities of individual mailboxes corresponding to individual e-mail addresses included in the plurality of e-mail addresses that belongs to the specific domain;

specifying, by a specifying unit, a remaining available capacity based on the information of the set capacities of the individual mailboxes and the information of the limit of the capacity of the whole mailbox;

transmitting, to an external apparatus by a change screen transmission unit, a change screen on which values of the set capacities of the mailboxes corresponding to the individual e-mail addresses can be individually received, the change screen including information of the remaining available capacity specified by the specifying unit;

receiving, from the external apparatus by a reception unit, a value of a set capacity of a mailbox corresponding to an e-mail address included in the plurality of e-mail addresses, the value of the set capacity being received via the change screen transmitted by the change screen transmission unit;

determining, by a determining unit, whether the set capacities of all mailboxes corresponding to the plurality of e-mail addresses that belongs to the specific domain do not exceed the limit of the capacity of the whole mailbox assigned to the specific domain if the set capacity of the mailbox corresponding to the e-mail address included in the plurality of e-mail addresses is changed to the value received by the reception unit; and changing, by a changing unit, the set capacity of the mailbox corresponding to the e-mail address to the value received by the receiving unit if it is determined that the set capacities of all mailboxes corresponding to the plurality of e-mail addresses that belongs to the specific domain do not exceed the limit of the capacity of the whole mailbox assigned to the specific domain, wherein the obtaining unit, the specifying unit, the change screen transmission unit, the reception unit the determining unit, and the changing unit are implemented, at least in part, by a central processing unit (CPU) and a memory.

7. A non-transitory storage medium storing a program readable and executable in an information processing apparatus for storing a plurality of mailboxes that belongs to domains and performing capacity setting of a mailbox corresponding to an e-mail address included in a plurality of e-mail addresses that belongs to a specific domain from among the plurality of mailboxes that belongs to the domains, wherein the program instructs the information processing apparatus to serve as:

an obtaining unit configured to obtain information of a limit of a capacity of a whole mailbox assigned to a specific domain, and obtaining information of set capacities of individual mailboxes corresponding to individual e-mail addresses included in the plurality of e-mail addresses that belongs to the specific domain;

a specifying unit configured to specify a remaining available capacity based on the information of the set capacities of the individual mailboxes and the information of the limit of the capacity of the whole mailbox;

a change screen transmission unit configured to transmit, to an external apparatus, a change screen on which values of the set capacities of the mailboxes corresponding to the individual e-mail addresses can be individually received, the change screen including information of the remaining available capacity specified by the specifying unit;

a reception unit configured to receive, from the external apparatus, a value of a set capacity of a mailbox corresponding to an e-mail address included in the plurality of the e-mail addresses, the value of the set capacity being received via the change screen transmitted by the change screen transmission unit;

a determination unit configured to determine whether the set capacities of all mailboxes corresponding to the plurality of e-mail addresses that belongs to the specific domain do not exceed the limit of the capacity of the whole mailbox assigned to the specific domain if the set capacity of the mailbox corresponding to the e-mail address included in the plurality of e-mail addresses is changed to the value received by the reception unit; and a changing unit configured to change the set capacity of the mailbox corresponding to the e-mail address to the value received by the change request reception unit if the determination unit determines that the set capacities of all mailboxes corresponding to the plurality of e-mail addresses that belongs to the specific domain do not exceed the limit of the capacity of the whole mailbox assigned to the specific domain.

* * * * *